W. W. HILL.
Bolt-Cutters.
No. 137,076. Patented March 25, 1873.
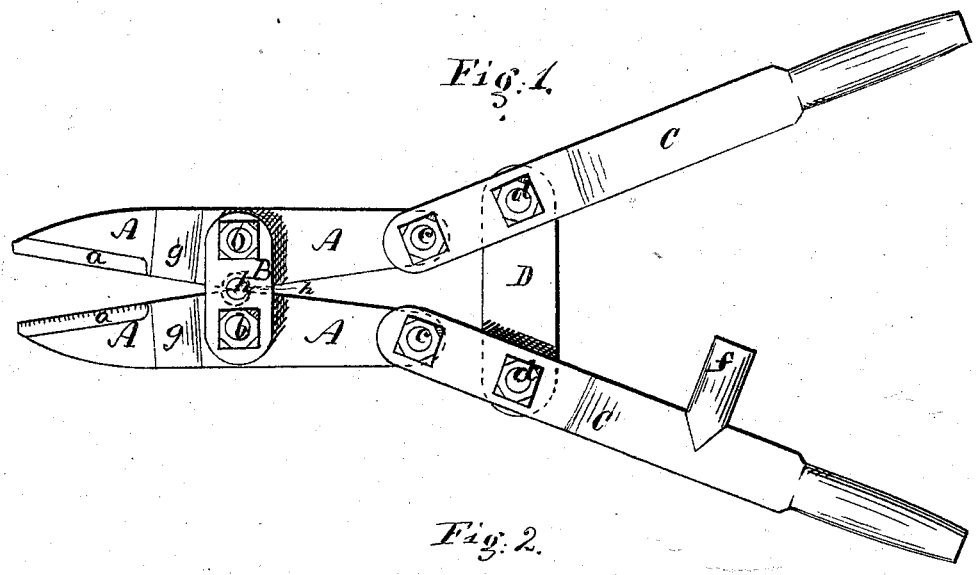
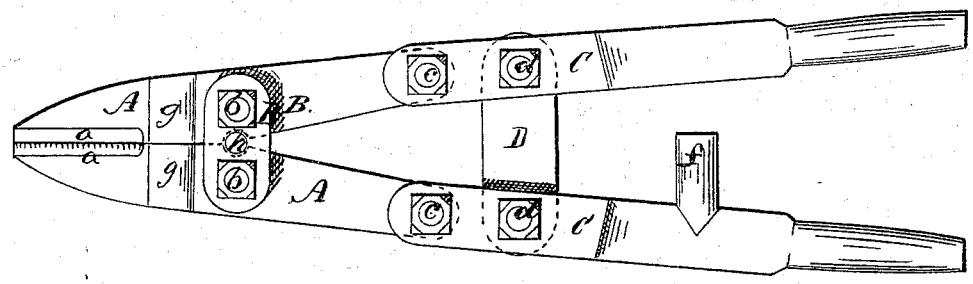
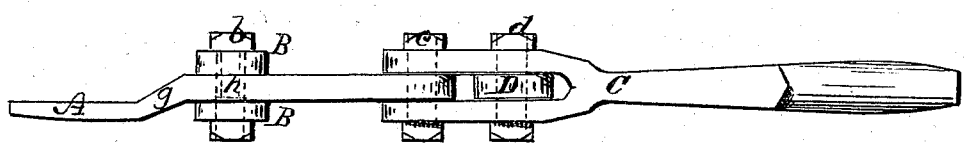

UNITED STATES PATENT OFFICE.

WILLIAM W. HILL, OF FULTON, NEW YORK.

IMPROVEMENT IN BOLT-CUTTERS.

Specification forming part of Letters Patent No. 137,076, dated March 25, 1873.

*To all whom it may concern:*

Be it known, that I, WILLIAM W. HILL, of Fulton, in the county of Oswego and State of New York, have invented an Improved Bolt-Cutter; and I do hereby declare that the following is a full and exact description thereof, reference being had to the accompanying drawing making part of this specification.

Figure 1 being a top view of the bolt-cutter with the blades open; Fig. 2, a top view thereof with the blades closed; Fig. 3 a side view of the instrument.

Like letters designate corresponding parts in all of the figures.

Two cutting-blades, A A, are pivoted edge to edge, between two fulcrum bars or plates, B B, by two bolts, $b\ b$; two lever-handles, C C, are pivoted to a fulcrum bar or plate, D, by two bolts $d\ d$; and the blades and lever handles are respectively pivoted together by bolts $c\ c$, all substantially as represented. The lever-heads are slotted or forked to receive the ends of the blades A A, and preferably also the fulcrum-bar D. All the pivot-bolts are or may be secured in place by nuts screwed thereon, so that the instrument can be readily taken apart. A guard-stud, $f$, projects from one lever-handle toward the other, to prevent injuring the hands if any part breaks or gives way. The leverage given to the handles and blades may be as great as desired. The blades A A have their beveled edges $a\ a$ both on the upper side for trimming bolts and rivets, the edges simply cutting together, and they have downward bends or offsets $g\ g$ just back of the cutting-edges, in order to cut off bolts and rivets as close as desired to the surfaces from which they project; but when the instrument is constructed for cutting off rods, &c., and not for trimming close to surfaces, the bevels of the blades are on opposite sides, and the blades cut by each other like ordinary shear-blades. A pin, $h$, or its equivalent is inserted in one or both of the fulcrum-bars B B, extending from bar to bar between the adjacent edges of the blades, which have notches to fit around the pin when they are closed together. This is for the purpose of preventing longitudinal motion of one blade on the other, and the sliding of the bolts or rods between them. The instrument is applicable to cutting off or trimming bolts, screws, rods, and bars, for various uses and purposes.

What I claim as my invention, and desire to secure by Letters Patent, is—

1. The bolt cutter and trimmer composed of the blades A A, fulcrum bars or plates B B, lever-handles C C, and fulcrum bar or plate D, pivoted together and operating substantially as herein specified.

2. The pin $h$, in combination with the notched jaws, substantially as and for the purpose herein specified.

Specification signed by me this 13th day of May, 1872.

WM. W. HILL.

Witnesses:
　E. S. PARDEE,
　H. C. HOWE.